United States Patent Office 3,565,697
Patented Feb. 23, 1971

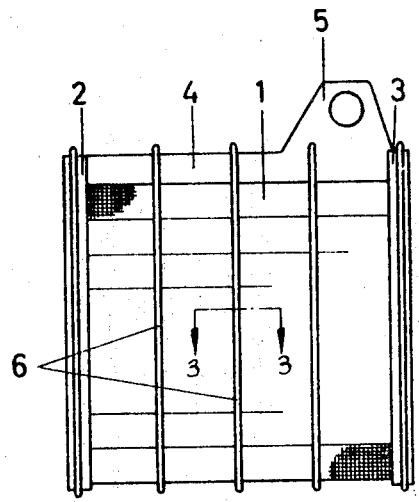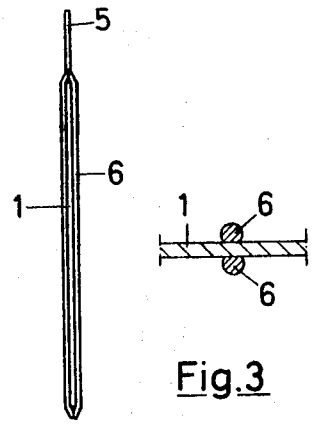
Fig.1  Fig.2  Fig.3
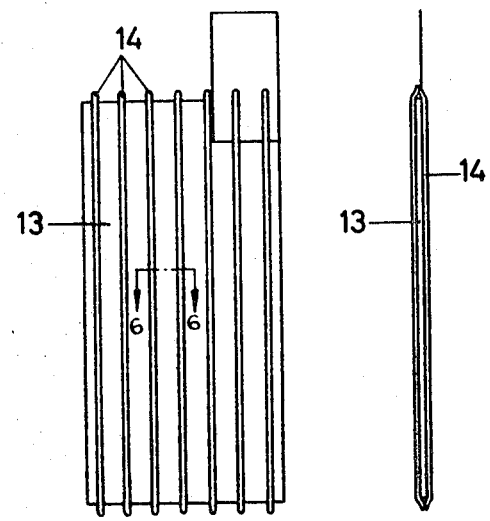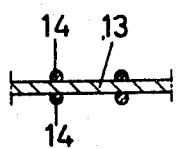
Fig.4  Fig.5  Fig.6

3,565,697
METHOD OF ARRANGING SEPARATOR MEMBERS BETWEEN ELECTRODES OF DIFFERENT POLARITY IN A GALVANIC PRIMARY OR SECONDARY CELL, AND A GALVANIC CELL PROVIDED WITH SUCH SEPARATOR MEMBERS
Arne Olof Nilsson and Jan-Erik Karlsson, Oskarshamn, Sweden, assignors to Svenska Ackumulator Aktiebolaget Jungner, Oskarshamn, Sweden, a corporation of Sweden
Filed Apr. 19, 1968, Ser. No. 722,708
Claims priority, application Sweden, Apr. 28, 1967, 6,131/67
Int. Cl. H01m 3/00
U.S. Cl. 136—142         5 Claims

ABSTRACT OF THE DISCLOSURE

Separators between electrodes of different polarity in galvanic primary or secondary cells are obtained by providing the electrodes with extruded strings of an electrically insulating material. The extruded strings can be deposited on pre-heated electrodes and cured by infrared heating. The extruded strings contain an adhesive additive to bond the strings to the electrode.

---

Figure 7:
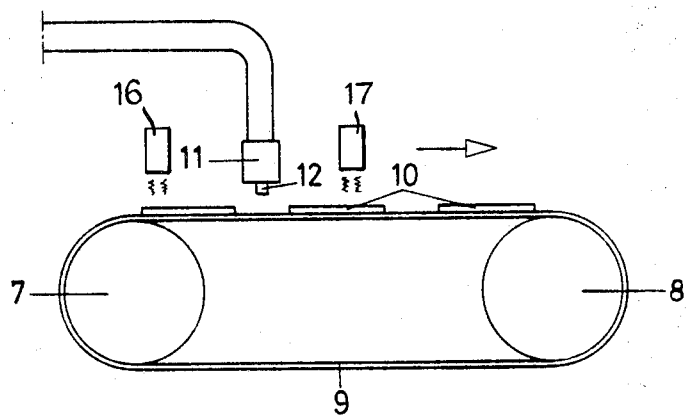

The invention is concerned with a method of arranging separator members between electrodes of different polarity in a galvanic primary or secondary cell.

In alkaline accumulators presenting electrodes of the so-called pocket type, that is electrodes comprising pockets or sleeves made of perforated sheet metal and filled with an active material, the partitions or separators disposed between the electrodes of different polarity are usually in the form of a number of loose insulating rods made of ebonite or some suitable plastic material, disposed in vertical grooves in the side surfaces of the electrodes. The insulation rods are inserted in their respective grooves subsequent to the electrodes being stacked to form a complex of alternating positive and negative electrodes; a manual method which is both time consuming and expensive. The method according to the invention circumvents this time consuming assembly of the insulating rods; besides which the grooves disposed in the sides of the electrodes or the insulating rods can also be excluded in that the separators are comprised of strings or beads extruded onto one or both side surfaces of the electrodes and comprising an adhesive electric insulating material. The invention is also concerned with a galvanic primary or secondary cell provided with separators produced according to the method.

The invention is also suited for other types of electrodes intended for use in primary and secondary cells. In galvanic cells where the electrodes comprise porous bodies of sintered metal powder, the pores of which contain an active material, the separators disposed between the electrodes of different polarity comprise porous, electrolyte permeable diaphragms, which cover the side surfaces of the electrodes either completely or partially. Despite the often very small thickness of such separators it gives rise in a cell to a material inner resistance, in addition to which it impedes the departure of gas, particularly when charging. Many suggestions have been made for reducing the electric resistance promoted by a flat separator. It is thus known to apply to the electrode very thin, adhesive semi-permeable or porous layers of an electric insulating material. By providing the electrodes in a cell with separators according to the invention the internal resistance of the cell can be substantially reduced, which results in improved loading characteristics of the cell. At the same time gas departure is facilitated.

The invention can also be applied in the case of, for instance, compressed powder and solid electrodes. It is known in the case of solid electrodes to attach distance means in the form of round knobs or blocks. This is particularly applicable to certain water-activatable primary batteries, the negative electrodes of which comprise, for instance, magnesium, in which it is desired to rapidly dispel the magnesium hydroxide formed during the electro-chemical reaction.

Application of the extruded strings according to the invention is preferably effected by means of a thermostat controlled extrusion tool provided with a number of extrusion nozzles corresponding to the desired number of strings, said strings being applied to the electrode simultaneously as it is moved past the tool. The extrusion compound preferably comprises a thermo-plastic resin, preferably containing an addition of a substance which increases the adhesion properties of the material. The adhesion of the strings to the electrode can be improved still further by heating the electrodes somewhat before the strings are applied. The string material may also comprise a suitable thermosetting resin, e.g. an epoxy resin which is applied to the electrode in combination with a suitable hardener. To expedite the hardening process it is suitable to heat the electrode before or after the strings are extruded thereon, e.g. by means of an infrared radiating means.

According to the present invention the strings can be applied onto one or both sides of the electrodes. However, it has been found advantageous to supply only electrodes of a certain polarity, e.g. the negative electrodes with strings on both sides. The extruded strings extend substantially parallel with the vertical side edges of the electrodes and extend substantially to the height of the electrodes. When both sides of the electrode are provided with strings it is suitable to apply said strings opposite each other and allow them to extend somewhat beyond the upper and/or lower edge of the electrode, and to allow said strings to meet. In this way the strings are retained in position even though they should be completely or partially loosened from their foundation.

In alkaline cells presenting so-called pocket electrodes besides the hitherto used insulation rods are also usually used electrically insulating separators in the form of U-shaped bars which envelop the vertical side edges of the electrodes. These U-shaped bars are generally made of the same material as the insulation rods and similarly to these are assembled manually, which is of course, both time consuming and expensive. These U-shaped rods may also be replaced by means of the present invention with extruded strings of an electric insulating material, which is applied close to and parallel with the vertical side edges of the electrodes, on, or in the proximity of the frame of nickel plated steel metal sheet which surrounds the perforated sheet metal pockets.

Figure 8:
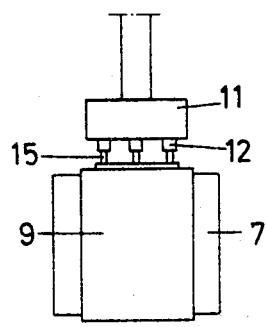

The invention will now be described more in detail with reference to the accompanying drawings in which:

FIG. 1 shows a so-called pocket electrode presenting strings according to the invention extruded on both sides thereof, FIG. 2 shows a side view of the electrode according to FIG. 1, FIG. 3 shows a horizontal section through the electrode according to FIG. 1, FIG. 4 shows a flat, sintered electrode presenting extruded strings according to the invention, FIG. 5 is a side view of the electrode according to FIG. 4, FIG. 6 is a horizontal section through the electrode according to FIG. 4, FIGS. 7 and 8 show an apparatus for extruding the strings.

FIGS. 1–3 illustrate a so-called pocket electrode presenting horizontal pockets 1 of perforated sheet metal and containing active material, the said pockets being held together by a metal frame comprising two vertical collecting bars 2 and 3 which are connected at their upper ends by a transversal extending bar 4, provided with a connecting fin 5. Arranged on both sides of the electrode and disposed opposite one another are adhesive strings 6 made of a thermoplastic material and extruded according to the invention, the strings extending somewhat beyond the upper and lower edges of the electrode, where they are joined. The strings, which are disposed vertically below the connecting fin of the electrode, are joined only at the bottom edge of said electrode. The strings are extruded to the electrode continuously by means of the device shown in FIGS. 7 and 8. The electrodes 10 are advanced on an endless conveyor belt 9 driven by two rolls 7 and 8 in the direction of the arrow at an appropriate speed under a thermostat-controlled extrusion tool 11 provided with a number of extrusion nozzles 12 adapted to the width of the electrode. The desired position of the strings can be obtained exactly by means of, for instance, micro-switches or photocells. To increase the adhesion of the strings to the electrodes it is suitable to heat the electrodes before the strings are extruded thereon, for instance by means of an infra-red radiating means 16. This extends the time taken for the string material 15 to solidify so that it partially penetrates into the perforations of the electrode pockets, thus resulting in an improved adhesion between said strings and the electrodes.

It is not apparent from the device shown in FIGS. 7 and 8 for applying strings according to the invention how the strings are applied to both sides of an electrode. This can be effected in different ways, either by first extruding strings on one side of an electrode moved past the device in a horizontal position, whereafter the electrode is turned and supplied with strings on the other side thereof by means of the same extrusion tool or another such tool, or alternatively the two sides of the electrode can be provided with strings simultaneously, whereby in such a case the electrodes should preferably move vertically upwardly or downwardly between two extrusion tools the extrusion nozzles of which are disposed opposite one another and at a distance from one another which is inconsiderably greater than the thickness of the electrode.

In the latter instance there is less risk of the strings being deformed before they have solidified, besides which the joining of the strings and the upper and lower edge of the electrodes is better than in the first instance. Alternatively, the extrusion tools may be movable and the electrodes stationary during the extrusion process.

As can be seen from FIG. 1 the vertical collecting bars 2 and 3 forming part of the electrode frame can be provided with extruded strings, which replace the previously used U-shaped bars for insulating the side edges of the electrode, and which embrace the vertical electrode edges.

The cross sectional area of the extruded strings may present arbitrary shape. However, it is preferred that the strings present a cylindrical or a substantially cylindrical shape. The thickness of the strings and the distance between adjacent strings varies with the type and size of the electrode. When concerning pocket electrodes the strings may have a thickness of, for instance, 0.7–3.0 mm. depending upon which insulation distance is desired between the electrodes, and the distance between adjacent strings is preferably approximately 20–30 mm. When concerning other types of electrodes, for instance, sintered electrodes, which owing to their small thickness do not possess the same degree of rigidity as the pocket electrode, it may be necessary to reduce the distance between the strings to reduce the risk of short circuiting. This is evident from FIGS. 4–6, which show a sintered electrode 13 of certain polarity, the two sides of which have been provided with extruded strings 14 according to the invention. The distance between the strings is, in this instance, only approximately 10 mm. In the case of a sintered electrode the thickness of the strings is often less than in the case of a pocket electrode, generally approximately 0.5–0.7 mm.

What we claim is:
1. A method of making a composite electrode separator unit for a galvanic primary or secondary cell comprising the steps of advancing an electrode plate past an extruder with a plurality of extruder nozzles, extruding electrically insulating strings of a plastic material onto the electrode plate, and adhering the plastic material to one side of the electrode in a substantially parallel direction to the side edges of the electrode plate.

2. A method according to claim 1, where the plastic material is a thermosetting resinous material.

3. A method according to claim 2, where the extruding step is repeated on the other side of the electrode and joins the first extruded strings at the upper edge of the electrode to form a U-shape insulator.

4. A galvanic primary or secondary cell having electrodes provided with extruded strings produced according to the process of claim 1.

5. The method of providing insulators on battery electrodes comprising the steps of pre-heating the electrode, advancing the electrode past an extruder, extruding a continuous filament of thermosetting resin with an adhesive additive onto and beyond the upper and lower edge of one side of the electrode, repeating the extruder step on the other side of the electrode to permit the extruded filaments to meet and bind together to envelop the electrode, and heating the electrode and filament with infra-red radiating means to expedite the hardening and adhesion of the filament onto and about the electrode.

References Cited

UNITED STATES PATENTS

| | | | |
|---|---|---|---|
| 1,506,391 | 8/1924 | Sturges | 136—147 |
| 1,633,257 | 6/1927 | Lahey | 136—151 |
| 2,970,181 | 1/1961 | Corren | 136—143 |
| 3,129,118 | 4/1964 | Wilke et al. | 136—145UX |
| 3,261,718 | 7/1966 | Wilke | 136—143X |
| 3,272,657 | 9/1966 | Zenczak | 136—145X |

DONALD L. WALTON, Primary Examiner

U.S. Cl. X.R.

136—148